Jan. 5, 1943. M. MARGOLIN 2,307,416
RESILIENT BREATHING INSOLE
Filed Aug. 17, 1939 3 Sheets-Sheet 1

INVENTOR.
Meyer Margolin
BY Ostrolenk & Greene
ATTORNEYS

Jan. 5, 1943.　　　　M. MARGOLIN　　　　2,307,416
RESILIENT BREATHING INSOLE
Filed Aug. 17, 1939　　　3 Sheets-Sheet 2
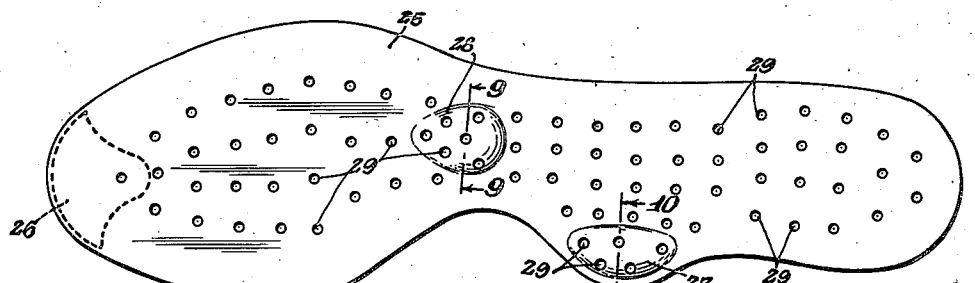
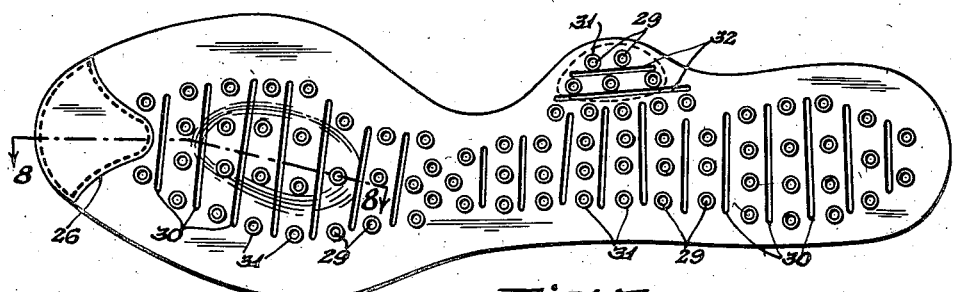
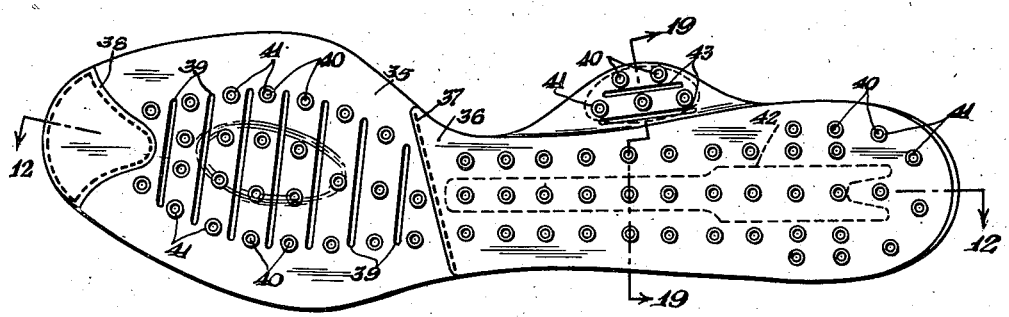
INVENTOR.
Meyer Margolin
BY
Ostrolenk & Greene
ATTORNEYS Jan. 5, 1943.     M. MARGOLIN     2,307,416
RESILIENT BREATHING INSOLE
Filed Aug. 17, 1939     3 Sheets-Sheet 3
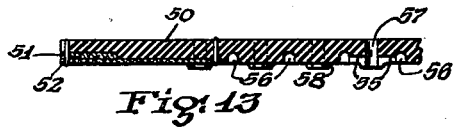
Fig. 13
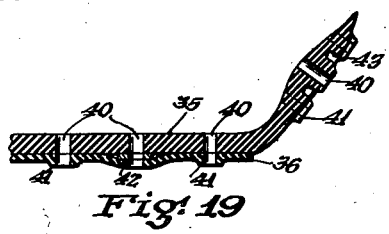
Fig. 19
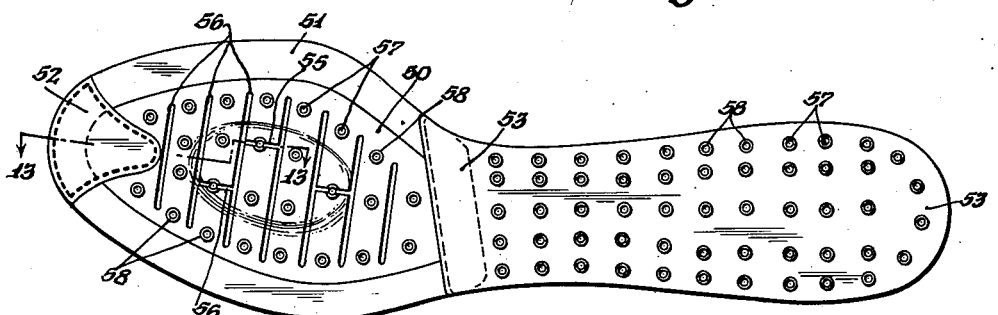
Fig. 14
Fig. 16
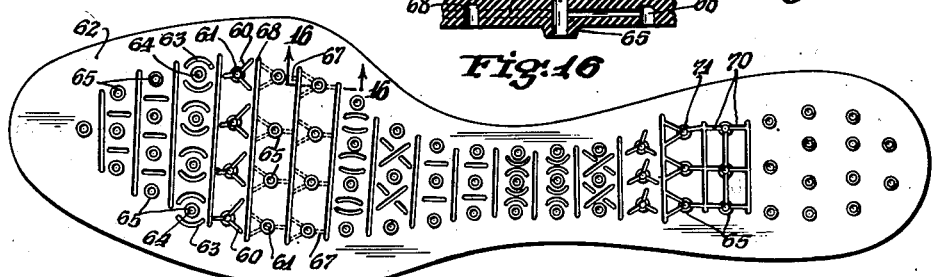
Fig. 15
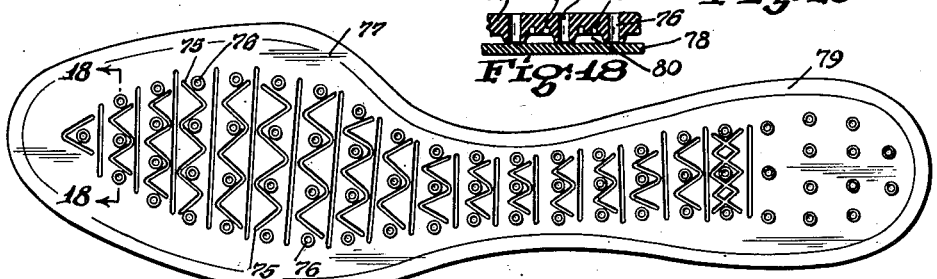
Fig. 18
Fig. 17
INVENTOR.
Meyer Margolin
BY Ostrolenk & Greene
ATTORNEYS Patented Jan. 5, 1943

2,307,416

UNITED STATES PATENT OFFICE 2,307,416

RESILIENT BREATHING INSOLE

Meyer Margolin, Elgin, Ill.

Application August 17, 1939, Serial No. 290,559

1 Claim. (Cl. 36—3)

My invention relates to an arch support and more specifically to an arch supporting device comprising expanded rubber which is provided with such construction as to make possible a constant and forced breathing in the shoe.

The arch support of my invention generally comprises an integrally molded resilient and flexible material which is highest along the center of its longitudinal axis and tapers down from there to a feather edge thickness at its periphery.

A rigid member may be employed along the longitudinal axis in order to provide the necessary rigid base support for the arch support. Across the areas of appreciable thickness in this device extend transverse grooves of substantial width having a substantially rectangular cross-section. When this device is employed in the shoe and is flexed in the act of walking, the grooves are alternately expanded and contracted to provide a forced breathing which forces air circulated thereby up through perforations which extend through the thickness of this arch support and which perforations are located over the entire areas of this arch support and spaced at a small distance one from the other.

The arch support above generally described may be given an upper cover of leather which is perforated in such a manner so that the perforations correspond to the perforations in the resilient material which comprises the arch support. In this way the breathing is not interfered with. The arch support is adapted to be placed within the ordinary shoe in order to correct the positioning of the arch of the wearer. It also acts as a resilient cushion to the foot of the wearer and may carry in the metatarsal region an arch support which consists in an integrally molded raised area of rubber.

At the side of my arch support and extending upwardly and around the long arch of the foot is an extension to afford support for the longitudinal arch. In order to gradually build up the support in this particular area, I provide recesses in the form of holes larger than the ordinary air perforations located in this area which are adapted to receive projections which are carried by cookies. These cookies may be added on to the arch support to build up the thickness to get additional height in this area. These cookies may be in the form of relatively thin resilient wafers which carry projections on their underside and recesses on their upper side so that a multiplicity of such cookies may be superimposed one upon the other in order to build up and provide the ultimate desired thickness in this particular area, as shown in my copending application S. N. 272,364.

My invention further relates to a novel resilient insole comprising a resilient material such as expanded rubber, said resilient insole extending from toe to heel. For purposes of shoe construction a shank tuck may be positioned under the shank and heel portion of the resilient insole. About the middle of the inner side of this resilient insole there extends a longitudinal arch supporting area which may be built up of superimposed cookies as above pointed out.

A further modification of my invention consists in using a resilient insole which extends from toe to heel comprising resilient material such as rubber and in the fore part of such resilient insole about the periphery thereof, the rubber may be molded to provide a seat for the marginal area of a cut out insole. Attached to this insole is a shank portion which extends backwardly therefrom. These resilient insoles may be integrally molded with a metatarsal arch support therein and may also carry perforations for breathing purposes which are scattered over substantially the entire area of the insole. Grooves on the bottom provide forced breathing through the perforations.

In order to facilitate this forced breathing I provide communicating grooves or arteries which connect the transverse grooves with the perforations through the insole or arch support so that the air that is compressed and forced from these transverse grooves in the act of walking may be quickly and fully dispersed through said grooves or arteries, through said perforations and hence in contact with the foot of the wearer. These grooves or arteries may be in the form of grooves molded in the bottom surface of the resilient material such as rubber or they may be in the form of channels in the interior of the molded material, said channels extending through the molded material and connecting the respective grooves and perforations.

I have found that these channels may be from a commercial standpoint formed by molding them as grooves on the bottom surface. When I employ these connecting grooves or arteries, I may or may not use the reinforcing bosses at the ends of the perforations since with these grooves the bosses may not be necessary for proper breathing action.

Although I have specifically set forth transverse grooves having spaced walls as the means by which I obtain the forced breathing, I also propose the use of grooves having spaced relatively parallel walls of varying forms. By means of these grooves of varying forms and curvatures I may take advantage of different flexing actions of the insole and hence obtain an additional or superior forced breathing action. These grooves specifically may, for example, take the form of zig-zags in which form I obtain relatively larger areas of grooves for the insole dimensions provided and hence obtain added forced breathing action.

Accordingly, it is the object of my invention to provide a novel arch supporting member for a shoe consisting of a resilient material such as expanded rubber, said arch support being provided with means for causing forced breathing therethrough.

It is a further object of my invention to provide a novel cellular rubber arch support with a rigid support positioned therein.

It is a further object of my invention to provide a novel arch support in which grooves are positioned on the flexible portions in order to provide forced breathing through perforations located through the arch support area.

It is a further object of my invention to provide a novel resilient insole which extends from toe to heel which carries on the bottom thereof transverse grooves which force air during flexing thereof through perforations contained in said resilient insole.

It is a further object of my invention to provide a novel insole in which said insole carries integrally arched therewith a longitudinal arch support in which may be superimposed cookies.

An important feature of my invention lies in the incorporation of an arch support integrally molded into the resilient insole above discussed. In this construction I mold resilient material in the region of the long arch together with the resilient insole itself.

Accordingly, it is the object of my invention to provide a complete resilient insole which carries integrally therewith a molded arch support.

Referring now to the drawings,

Figure 6 is a plan view of a complete heel to toe resilient insole of my invention.

Figure 7 is a plan view of the insole shown in Figure 6.

Figure 8 is a cross section taken along the line 8—8 of Figure 7.

Figure 9 is a cross section taken along the line 9—9 of Figure 6.

Figure 10 is a cross section taken along the line 10—10 of Figure 6.

Figure 11 is a bottom view of the resilient insole of my invention showing the resilient insole of my invention in combination with a shank tuck attached thereto at the base of the forepart.

Figure 12 is a cross section taken along the line 12—12 of Figure 11.

Figure 13 is a cross section taken along the line 13—13 of Figure 14.

Figure 14 is a bottom view of a modified form of a resilient insole of my invention.

Figure 15 is a bottom view of a modified form of my invention in which various grooves to provide forced breathing are shown.

Figure 16 is a cross section taken along the line 16—16 of Figure 15.

Figure 17 is a bottom view of another modified form of my invention in which zig-zag grooves provide forced breathing under the various flexings.

Figure 18 is a cross section taken along the line 18—18 of Figure 17.

Figure 19 is a cross section taken along the line 19—19 of Figure 11.

Figure 1:
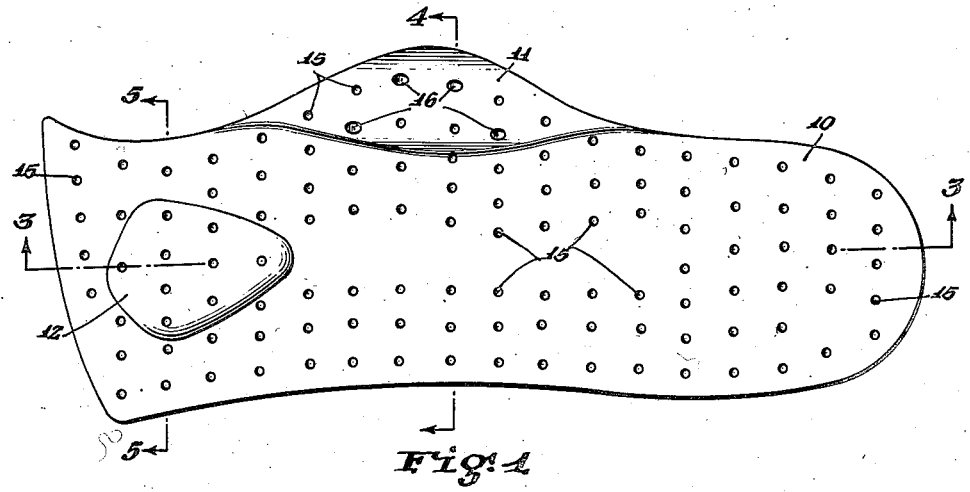
Figure 1 is a plan view of the molded arch support of my invention.

Referring now more specifically to the drawings, in Figure 1, 10 represents the molded resilient arch support of my invention. This arch support is adapted to be superimposed on the insole of a shoe to provide any desired support of the arch and is formed for example by molding expanded rubber of the configuration shown. 11 represents the up-turned long arch support and 12 represents an integrally molded metatarsal arch support. Perforations 15 are homogeneously spaced throughout the area of the arch support to provide proper breathing and air for the foot.

Figures 4, 5:
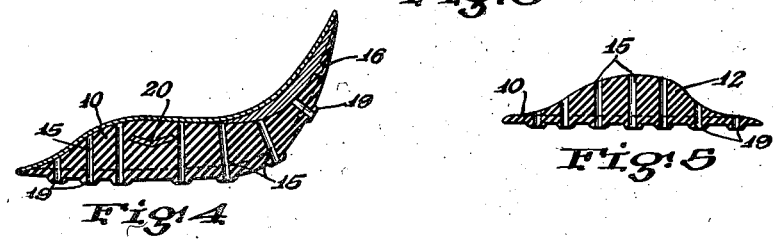
Figure 4 is a cross-section taken along the line 4—4 of Figure 1.
Figure 5 is a cross section taken along the line 5—5 of Figure 1.

In the long arch support are recesses 16 which are adapted to receive mating projections by means of which the height of this arch support is increased in this particular area, as shown in Figure 4.

Figure 2:
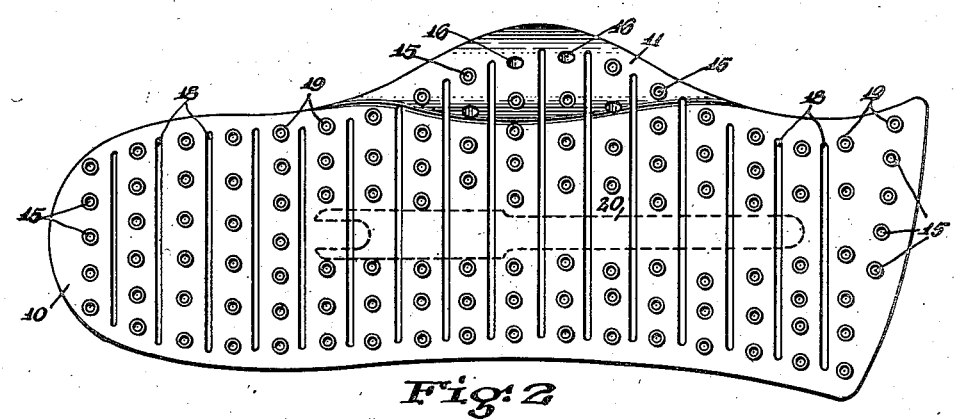
Figure 2 is a bottom view of the arch support of Figure 1.

In Figure 2 which shows the bottom of this arch support there are transverse grooves 18 which extend partially across the arch support and which, upon flexing, drive air through the perforations 15 to the area of the foot.

At the bottom of the perforations 15 are bosses 19 which increase the softness of the arch support and which assist in the passage of air from the groove 18 through the perforations 15.

As shown by dotted lines in Figure 2 a rigid metal support 20 may be employed, as by molding within the arch support, to assist in maintaining the resilient arch support in proper shape. The arch support construction of my invention makes possible an integrally molded resilient unit of expanded rubber by means of which the ordinary difficulties of accustoming the foot to an arch support are obviated. The resilient material of which this arch support is made makes the support extremely comfortable.

Hitherto, these supports have been made of a metal frame work covered with leather and such arch support is decidedly uncomfortable for the foot. A rubber support has been impractical largely because of the problem of foot comfort. By means of the system of forced breathing which I effect as shown by the grooves and perforations, I have obviated the difficulties hitherto experienced in this art. All portions of the base area of my arch support that are flexed carry the transverse grooves which, when flexed, force air through the perforations to the foot.

Figure 3:
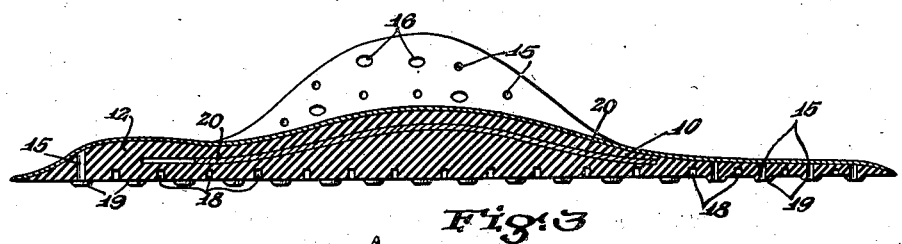
Figure 3 is a cross section taken along the line 3—3 of Figure 1.

Figure 6 shows a heel to toe length resilient insole 25 which has a rigid toe piece 26 and which carries integrally molded therewith an arch support 27 and a metatarsal arch support 28. Perforations 29 extend through the resilient insole for breathing thereof. Although not shown specifically here a raised central long arch support may be molded integrally with this resilient insole 25 which would give to the middle area of this resilient insole the configuration shown in cross section in Figure 3. Thus, I can combine in a resilient insole not only the soft, free-breathing and flexible insole as provided by this construction, but also I may additionally provide arch support both for the long arch and for the metatarsal arch in accordance with Figures 1 to 5.

In Figure 7, I show the bottom of the resilient insole 25 and the transverse grooves 30 which extend partially across that bottom and which on flexing force air through the perforations 29 which are reinforced at their bottom by means of bosses 31. It will be noted that the grooves 32 which lie below the long arch support run at an angle normal to the transverse grooves 30. This is necessary to provide the forced breathing in this support area where the flexing takes place on an angle normal to the normal flexing of the resilient insole.

In Figure 11 the resilient insole 35 carries on its bottom a shank 36 which is attached by the fastening means 37 to the resilient insole 35. A stiff piece 38 reinforces the toe. Transverse grooves 39 force air through perforations 40 reinforced by the bosses 41. A rigid metallic shank reinforcement 42 is shown in dotted lines. Grooves 43 run along the length of the long arch support to provide proper breathing therefor.

Referring now to Figure 14 I show a modified construction of my invention in which a heel to toe resilient insole 50 carries a marginal relatively stiff edging 51 and a stiff toe piece 52. Attached to the marginal stiffening 51 is a shank reinforcement 53. The reinforcement shank extends over the middle and heel portion of the insole and is in the form of some suitable stiff material such as leather or composition. It is secured to the insole by stitching as shown. Thus in a single structure I provide a heel to toe resilient insole together with the necessary stiff portions for attachment to the outsole and upper.

On the bottom of the insole I show grooves 55 which connect the transverse grooves 56 with the perforations 57 which are reinforced with the bosses 58. By means of these connecting grooves air compressed by the flexing of transverse grooves 56 is forced directly up and through the perforations 57, as shown more clearly in cross-section in Figure 13.

In Figure 15 I show a variety of forms by means of which I can obtain the forced breathing which plays such an important part in the resilient insole of my invention. The various configurations of the grooves shown take advantage of the flexing of the insole in various directions so that no matter in what particular direction a flexing takes place there is an expansion and compression of air effected by means of which forced breathing is accomplished.

I provide various methods by means of which the air compressed by the flexing of the grooves may be transmitted to the openings. One method is by the provision of direct connections between the grooves 60 and the openings 61 in the resilient insole 62. Another is by forced transmission from the independent grooves 63 to the adjacent opening 64. Because of the bosses 65 at the bottom of these openings, the air from these independent grooves may travel through the space beneath the insole more easily into the perforation and up to the foot.

I also provide arteries 67 which run from the grooves 68 to the openings 63. These interior arteries carry air compressed in the groove 68 directly into the perforation and thence up to the foot area. An interlacing of grooves lying in different directions is shown at 70 and in this case the grooves are directly connected to the openings 71 and force air therethrough.

In Figure 17 I show a very efficient method of providing grooves 75 in zig-zag connected formation which either when independent from or connected to the perforations 76 by connecting grooves or arteries provide a constant and full forced breathing. The zig-zag formation takes advantage of every flexing of the insole to effect the desired breathing. Further a maximum air supply area is obtained in the insert 77.

Thus it can be seen that my invention comprises a novel resilient arch support and insole or combined arch support and insole molded preferably from expanded rubber such as sponge rubber or closed cell rubber and I provide for comfort features in the form of the resiliency of the molded material which has the integrally formed metatarsal and long arch. By long arch I mean the arch which extends from the heel to the ball of the foot along the inner side of the foot.

I have shown many novel forms in which I can obtain the desired forced breathing effects which add so greatly to the comfort of my construction. It is this particular breathing action which makes practical the rubber arch support and insole construction here shown since without this decided discomfort would result.

In Figure 17 it will be noted that the resilient insert of my invention is positioned within the cut out insole 79. In this construction, the entire interior body portion of the insole has been cut away leaving only the stiff marginal portion 79 as shown. The insert is secured to this insole by laps which extend out from the insert beneath the insole. In order to secure the proper affixing of the insert to the insole I may use a top lap or a bottom lap or both top and bottom laps which are secured as by sewing to the marginal insole 79 as specifically pointed out in my Patent No. 2,153,021, and my co-pending applications Serial No. 257,351 and Serial No. 272,364, of which this application is a continuation in part.

Further, although I have shown the insole 79 as comprising a cut out marginal area stamped from an insole I may also employ separate strips of stiffening material in lieu of this stamped out insole, said strips of stiffening material extending about the edges of the resilient insole and replacing the continuous integral marginal area 79 as shown. This construction is particularly pointed out in my application Serial No. 272,364.

The construction here shown provides great resilience and flexibility throughout the entire area of the insole. It is further within the purview of my invention to form the arch supports, more particularly shown in Figures 1 to 5, according to this same construction. That is, I would form a full length insole with the arch supporting areas molded integrally therewith, said arch support extending in the form of laps, either single or double, by means of which they are secured to a marginal stiffening material.

In Figure 18 I show a cross section taken along the line 18—18 of Figure 17, and here I have shown more particularly the air pocket formation which I obtain by means of raised bosses on the bottom of the resilient insert. Positioned directly below the resilient insert 77 is the outsole 78 of the shoe. It will be noted that between the respective bosses there are air pockets 80 and the air pressure developed when the shoe is flexed causes the air to pass in and through the perforations 76. The raised bosses, because they maintain the resilient insole spaced from the outsole, form the air pockets aforementioned. The pressure of the foot with each step compresses these air pockets and thereby forces the air from the pockets through the perforations to the inside of the shoe. Thus, I provide in addition to the air compressed in the grooves, further means for compressing and forcing the air up into the foot portion.

Although I have stated hereinbefore that the resilient insole or insert of my invention may be formed of resilient material and I have particularly mentioned expanded rubber, it is to be understood that I may use other types of resilient material and specifically by way of example, but not by way of limitation, I include cork, resilient fibrous materials, and resilient synthetic plastics, expanded or not.

Further I contemplate employing in lieu of the solid resilient material, a laminated formation in which the center is a relatively stiff material such as thin leather or felt or fibrous sheet material and laminated on both sides thereof, layers of resilient material, such as sponge rubber, cork, etc. In this laminated construction I cause the perforations to go completely through the resilient insole or insert so as to provide proper air passage for the breathing purposes discussed above, and I have found certain advantages in this type of construction in that I may obtain softness and resilience without sacrificing flexibility, since I may use an extremely thin middle supporting sheet material.

Further, although I prefer to mold the resilient insert of my invention integrally with a lap or laps extending therefrom for securing to the marginal rigid edging, I may also form said insert by joining a resilient material to a sheet material which extends beyond the edges of the resilient material and thus forms laps therewith. In that event, the extending edges of sheet material are joined to the rigid marginal edgings. In the case of this composite insert, I provide when necessary perforations for proper breathing and I may employ bosses and grooves if desired to gain the forced breathing effects.

I should like to call particular attention to the construction shown in Figure 14 in which I provide a resilient insole extending from heel to toe and a stiffening means which comprises a peripheral edging of leather or similar stiff material which extends about the forepart of the insole. This relatively stiff material may be countersunk in the forepart of the insole so that it does not protrude from the plane thereof.

I wish it to be understood that the many examples and modifications I have shown in my invention are for the purpose of broadly explaining the same and that I intend to be limited not by the specific construction by means of which I obtain the desired results but only by the appended claim.

I claim:

An insole comprising a soft and resilient rubberlike material, said insole comprising a heel portion, an arch portion and a forepart portion, said arch portion extending in part upwardly and sidewardly from said insole, perforations extending through said insole, and transverse grooves extending a substantial distance, but not entirely, across the bottom surface of said insole, said transverse grooves having closed end walls, the opposing long walls of said grooves being substantially parallel to and spaced apart from one another, so that upon the flexure of the insole in walking the grooves are compressed and decompressed causing air to be pumped in and out from said grooves.

MEYER MARGOLIN.